US010705978B2

United States Patent
Bedi et al.

(10) Patent No.: US 10,705,978 B2
(45) Date of Patent: Jul. 7, 2020

(54) ASYNCHRONOUS TRACKING FOR HIGH-FREQUENCY AND HIGH-VOLUME STORAGE

(71) Applicant: Verizon Digital Media Services Inc., Dulles, VA (US)

(72) Inventors: Harkeerat Singh Bedi, Los Angeles, CA (US); Donnevan Scott Yeager, Anderson Island, WA (US); Derek Shiell, Santa Monica, CA (US); Hayes Kim, Porter Ranch, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 0 days.

(21) Appl. No.: 16/173,978

(22) Filed: Oct. 29, 2018

(65) Prior Publication Data
US 2020/0133883 A1   Apr. 30, 2020

(51) Int. Cl.
*G06F 12/121*   (2016.01)

(52) U.S. Cl.
CPC .... *G06F 12/121* (2013.01); *G06F 2212/1021* (2013.01); *G06F 2212/45* (2013.01)

(58) Field of Classification Search
CPC ........... G06F 12/121; G06F 2212/1021; G06F 2212/45
See application file for complete search history.

(56) References Cited

U.S. PATENT DOCUMENTS

| | | | |
|---|---|---|---|
| 9,817,832 B1 * | 11/2017 | Protopopov | H04L 67/1095 |
| 2014/0189118 A1 * | 7/2014 | Hunter | H04L 65/40 709/225 |
| 2015/0271285 A1 * | 9/2015 | Hindawi | H04L 67/1089 709/213 |
| 2016/0072889 A1 * | 3/2016 | Jung | H04L 67/1097 |

* cited by examiner

*Primary Examiner* — Henry Tsai
*Assistant Examiner* — John B Roche
(74) *Attorney, Agent, or Firm* — Ansari Katiraei LLP; Arman Katiraei; Sadiq Ansari (57) ABSTRACT

Asynchronous file tracking may include a first process that adds files to a cache and that generates different instances of a tracking file to track the files as they are entered into the cache. A second process, executing on the device, asynchronously accesses one or more instances of the tracking file at a different rate than the first process generates the tracking file instances. The second process may update a record of cached files based on a set of entries from each of the different instances of the tracking file accessed by the second process. Each set of entries may identify a different set of files that are cached by the device. The second process may then purge one or more cached files that satisfy eviction criteria while the first process continues to asynchronously add files to the cache and create new instances to track the newly cached files.

20 Claims, 6 Drawing Sheets

ASYNCHRONOUS TRACKING FOR HIGH-FREQUENCY AND HIGH-VOLUME STORAGE

BACKGROUND ART

A cache manager may be a process or component for tracking files that are entered into cache of a device, and/or for purging files from the cache according to one or more cache eviction policies. The cache manager may operate independent of one or more other processes of the device that serve requested files in response to user requests, and/or enter the requested files into cache.

Synchronous operation may exist between the cache manager and other caching processes so that the cache manager can have an up-to-date view of what is in cache. For instance, a process may generate an inter-process communication ("IPC") message for conveying to the cache manager each file that is newly entered to cache as a result of a cache miss and/or that is served from cache as a result of a cache hit. The IPC messages may be entered in a queue. Cache manager may update its tracking of files in cache based on the IPC messages.

In a device that receives a high frequency and/or a high volume of requests, the rate at which the IPC messages are generated and entered in the IPC queue may exceed the rate at which the cache manager processes the IPC messages. The IPC message queue may overflow, thereby causing the cache manager to lose track of one or more files that were entered into cache and/or that were requested from cache. The cache manager may also lose track of cached files when the cache manager is unavailable because of a failure, restart, and/or other issue, and one or more other processes of the device continue to add file to and/or remove files from the device cache.

Upon losing track of some cached files, the cache manager may be unable to designate and/or remove those files from cache. Consequently, some files may remain permanently in cache, may reduce the overall cache footprint of the device, and/or may affect the cache-hit ratio of the device. To prevent the tracking issues from impacting the device, the device may be periodically reset, its entire cache may be purged, and the device may then be brought back online. The emptied cache would cause the device to experience a large number of cache misses for a period of time, and to provide poor performance as the cache is repopulated.

DETAILED DESCRIPTION

The following detailed description refers to the accompanying drawings. The same reference numbers in different drawings may identify the same or similar elements.

Systems and/or methods, as described herein, may provide asynchronous tracking for high-frequency and high-volume storage. The asynchronous tracking may eliminate inter-process communications (e.g., communications between separate processes for requested files, files entered to cache, files served from cache, and/or files purged from cache), and prevent potential of losing track of files that are entered into cache for purging purposes.

The asynchronous tracking may allow files to be entered into cache by a first process of the device asynchronously from updating a second process of the device with the updated cache and/or file information. The asynchronous tracking allows the two processes to operate independent of one another, and perform different operations at different rates without losing track of the files that are entered into and remain in cache. For instance, the first process may serve requested files in response to user requests, and/or may enter the requested files into cache. The second process may track the files that were entered into cache by the first process in order to purge one or more cached files according to one or more eviction policies. In some embodiments, the second process may be a cache manager that retains some files in cache while removing other files to preserve space within the cache and/or storage for new files that are continually being entered into cache.

Figure 1:
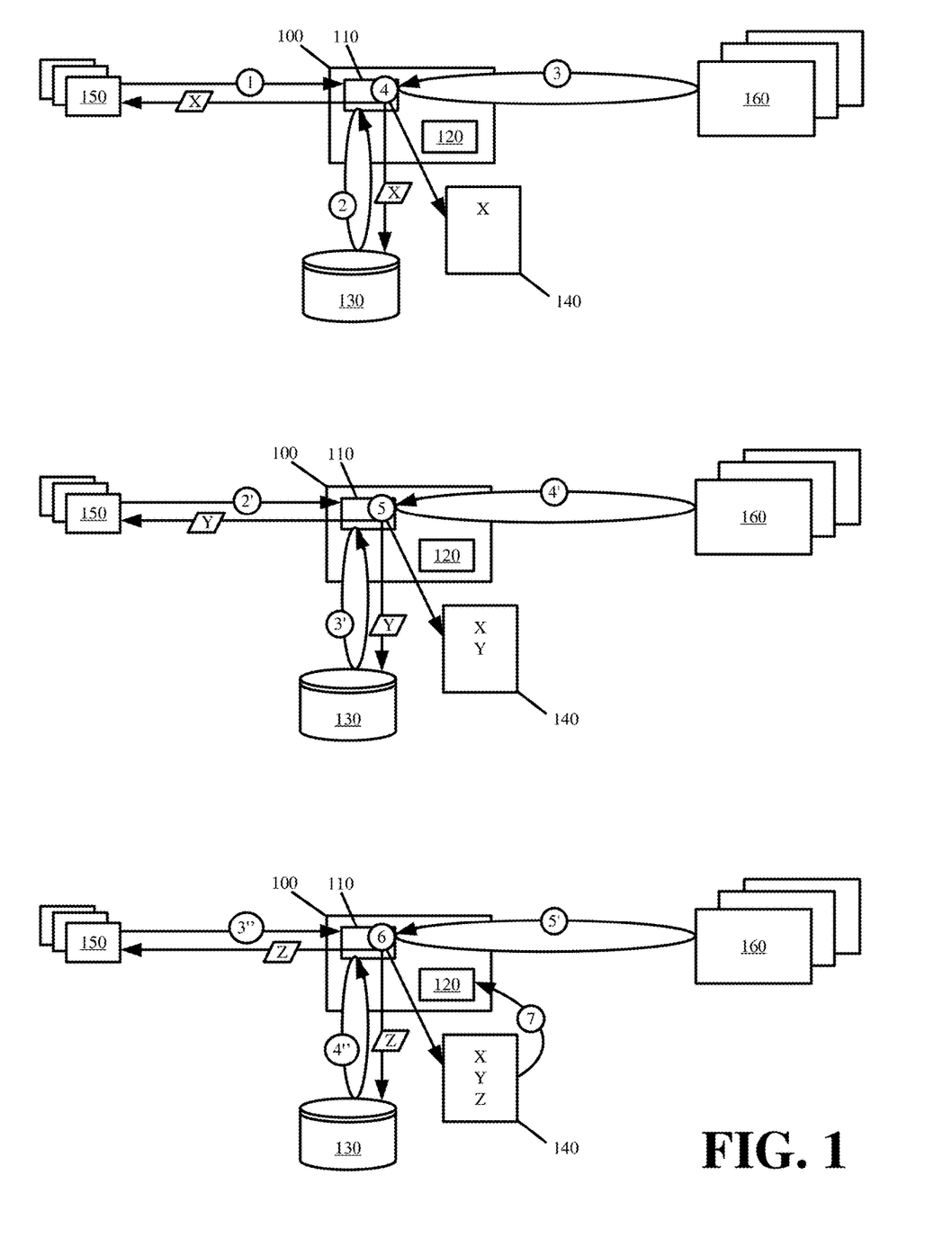
FIG. 1 illustrates example operation of a first of multiple processes for asynchronously tracking files in cache of a device with high-frequency and/or high-volume storage in accordance with some embodiments described herein.

FIG. 1 illustrates example operation of a first of multiple processes for asynchronously tracking files in cache of a device with high-frequency and/or high-volume storage in accordance with some embodiments described herein. Device 100 may include at least first process 110, second process 120, cache 130, and tracking file 140. Cache 130 may include a portion of memory, disk, and/or other storage of device 100 that is used to temporarily retain different files for efficient distribution to requesting clients 150. Tracking file 140 may be stored in cache 130 or in a separate portion of memory, disk, and/or other storage of device 100.

First process 110 may provide device 100 with server functionality. For instance, first process 110 may receive (at 1) a first request for a first file from one or more clients 150 over a digital network. The first request may be a HyperText Transfer Protocol GET message with a Uniform Resource Locator ("URL") that identifies the first file or content that is associated with first file.

In response to receiving the first request, first process 110 may query (at 2) cache 130 to determine if the requested first file is stored therein. A cache miss occurs when the requested file is not stored to cache 130.

In response to a cache miss, first process 110 may retrieve (at 3) the requested first file from origin 160. Origin 160 may be one or more servers or storage devices that can be remotely accessed by device 100 via a network connection. Origin 160 may be operated by different content publishers, with device 100 operating as a caching server for distributing the content (e.g., files) created by the different content publishers. In some embodiments, device 100 may be one or more caching servers of a content delivery network ("CDN") providing a first tier of file caching, and origin 160 may be provide a second tier of file caching for the CDN.

Upon retrieving a copy of the first file from origin 160, first process 110 may serve (at 4) the first file to requesting client 150, may enter (at 4) the first file to cache 130, and may append (at 4) tracking file 140 with an entry that identifies caching of the first file. Appending to tracking file 140 may be performed in place of a synchronous and/or any other communication between first process 110 and second process 120 (e.g., first process 110 providing an IPC message for receipt and/or processing by second process 120). In other words, first process 110 need not communicate the entry of the first file into cache 130 directly to second process 120, and/or second process 120 need not update its tracking of the first file as the first file is entered into cache 130.

Tracking file 140 may be an asynchronously accessed file. FIG. 1 further illustrates the asynchronous access of tracking file 140 by first process 110 and second process 120. For instance, after appending (at 4) the entry, corresponding to the caching of the first file, to tracking file 140, first process 110 may receive (at 2') a second request for a second file from client 150 some time after receiving (at 1) the first request for the first file.

First process 110 may query (at 3') cache 130 to determine that the second file is not in cache 130 and to retrieve (at 4') the second file from origin 160. First process 110 may serve (at 5) the second file to requesting client 150, may enter (at 5) the second file to cache 130, and may append (at 5) tracking file 140 with an entry that identifies caching of the second file.

First process 110 may also receive (at 3") a third request for a third file. First process 110 may retrieve (at 5') the third file from origin 160 before serving (at 6) the third file to requesting client 150, entering (at 6) the third file to cache 130, and appending (at 6) tracking file 140 with an entry that identifies caching of the third file.

Accordingly, first process 110 may access tracking file 140 multiple times prior to second process 120 accessing tracking file 140. FIG. 1 illustrates second process 120 asynchronously accessing (at 7) tracking file 140 after the three accesses by first process 110 at 4, 5, and 6.

In some embodiments, tracking file 140 may be inaccessible by second process 120 for a period of time. For instance, first process 110 may retain tracking file 140 in private memory or storage that cannot be accessed by second process 120 when appending (at 4, 5, and 6) tracking file 140 entries for the first, second, and third files, and may move tracking file 140 to shared memory or storage that can be accessed by second process 120 after appending (at 6) tracking file 140 with the third entry.

In some embodiments, first process 110 may make tracking file 140 accessible to second process 120 by writing tracking file 140 to a storage (e.g., cache 130) of device 100 that can also be accessed by second process 120. Second process 120 however may access tracking file 140 based on different access criteria than first process 110. For instance, first process 110 may access tracking file 140 to create a new entry each time a file is entered into cache 130, and second process 120 may access tracking file 140 at five minute intervals for updating and/or purging of cache 130.

In some embodiments, first process 110 may make different instances of tracking file 140 available to second process 120 based on one or more conditions. For instance, first process 110 may generate a different instance of tracking file 140 at a recurring time interval and/or when an instance of tracking file 140 is appended with a specific number of entries. For instance, first process 110 may generate a new instance of tracking file 140 every minute or after twenty new files are cached and recorded in a particular instance of tracking file 140.

Each instance of tracking file 140 may be differentiated by name. In some embodiments, each instance may include a common name with a different timestamp. For instance, first process may generate a first instance of tracking file 140 named "trackingfile_1032124" that is appended to include two entries for first and second files that were entered into cache 130 during a first minute, and may generate a second instance of tracking file 140 named "trackingfile_1032184" that is appended to include three entries for third, fourth, and fifth files that were entered into cache 130 during a subsequent second minute.

The different tracking file 140 instances created by first process 110 may remain in cache 130 and/or other storage (e.g., memory or disk) of device 100 until they are asynchronously accessed by second process 120. Second process 120 may delete or remove each instance of tracking file 140 after accessing that instance. In this manner, second process 120 can easily determine if there are one or more tracking file 140 instances that second process 120 has yet to access.

The asynchronous tracking of files in a high-frequency and high-volume storage is based on the independent writing of different tracking file 140 instances to device storage by first process 110, and the asynchronous access of those instances by second process 120. No file tracking information is lost if the rate at which first process 110 creates tracking files and/or entries to tracking files 140 differs from the rate at which second process 120 accesses the tracking files and/or updates its tracking of files in cache 130 based on the entries in the tracking file 140 instances. Similarly, no file tracking information is lost if either first process 110 or second process 120 experiences a temporary failure, provided that the tracking file 140 instances are retained in memory, disk, or other storage of device 100 that is also not subject to the failure.

If first process 110 is temporarily disabled, no file tracking information is lost as no new files are entered into cache 130 by first process 110. Files that were previously entered into cache may be tracked to one or more instances of tracking file 140 that second process 120 may access from storage of device 100 even when first process 110 is disabled. Even if first process 110 experiences a failure during an interval in which some entries for cached files have been added to an instance of tracking file 140, that instance of tracking file 140 may be written to shared storage of device 100 that second process 120 may access sometime after the interval expires.

If second process 120 is temporarily disabled, no file tracking information is lost as information about files newly entered into cache will be stored in one or more instances of tracking file 140 that remain on shared storage of device 100 until accessed and processed by second process 120. Accordingly, after a failure, second process 120 may resume operation by retrieving a previous state of tracked files, and by updating the previous state based on different instances of tracking file 140 that first process 110 has written to shared storage of device 100. In some embodiments, second process 120 may track a previous state for tracked files in cache 130 in a separate file that is recoverable should second process 120 experience a failure and need to restart. In other words, second process 120 may use the asynchronously accessed instances of tracking file 140 to update a separate table, database, or file maintained by second process 120 for tracking the previous state of tracked files in cache 130.

Figure 2:
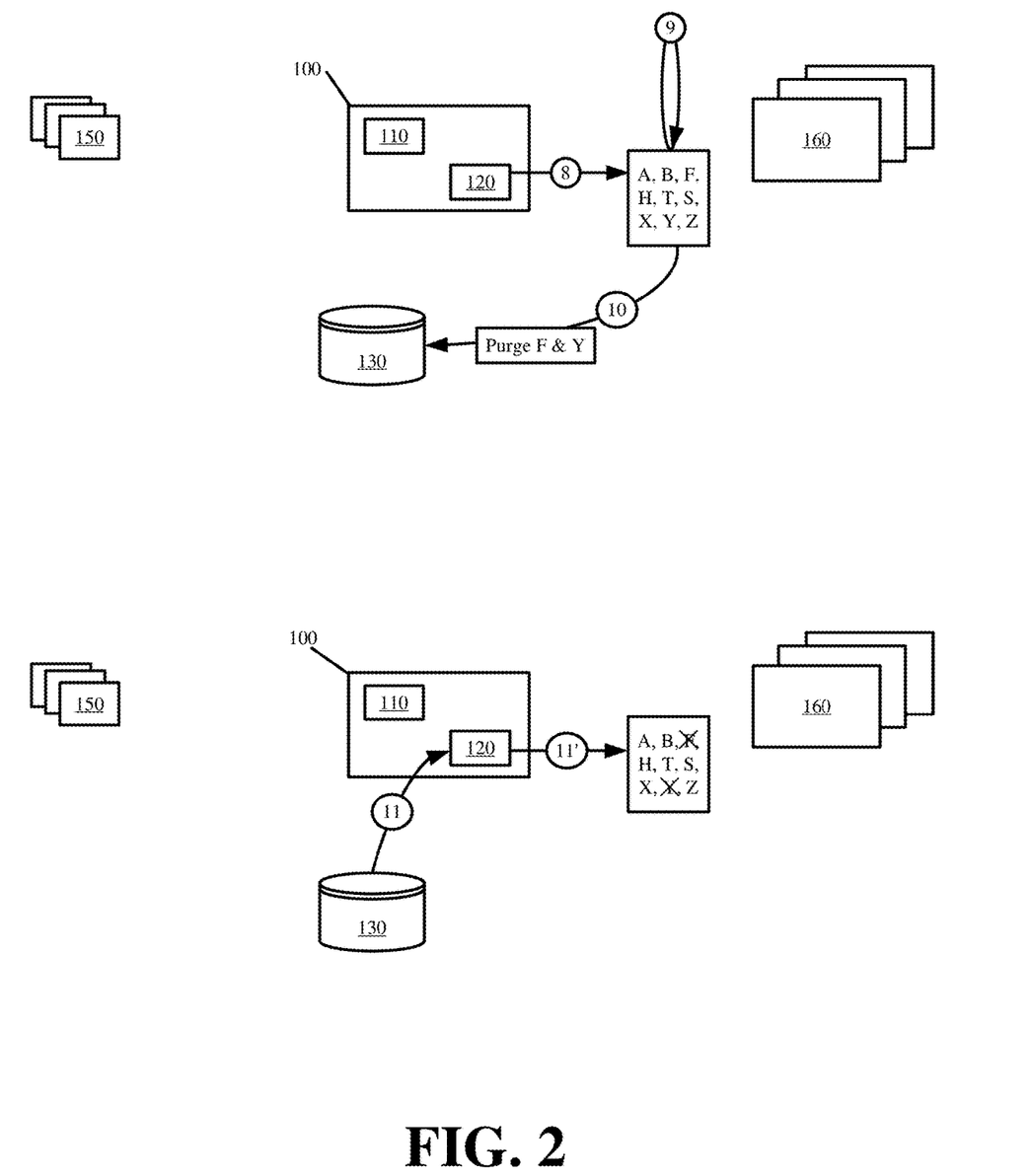
FIG. 2 illustrates example operation of a second of multiple processes for asynchronously tracking files in cache of a device with high-frequency and/or high-volume storage in accordance with some embodiments described herein.

FIG. 2 illustrates example operation of a second of multiple processes for asynchronously tracking files in cache of a device with high-frequency and/or high-volume storage in accordance with some embodiments described herein. Continuing from FIG. 1 and second process 120 asynchronously accessing (at 7) tracking file 140, second process 120 may update (at 8) its tracking of files stored to cache 130. As noted above, second process 120 may have a separate table, database, or file that tracks all previously entered files in cache 130. In some embodiments, second process 120 may simply aggregate entries from different instances of tracking file 140 into one table, database, or file and remove entries after purging files from cache 130.

Second process 120 may use one or more eviction policies to select (at 9) one or more cached files to remove from cache 130. For instance, second process 120 may be a cache manager that periodically or conditionally purges files from cache 130 to ensure that there is free space for first process 110 and/or device 100 to enter new files into cache 130. Second process 120, via the one or more eviction policies, may base the selection of files on age (e.g., time in cache), size, last access time, number of times accessed, and/or other file parameters. The selection may be performed at regular intervals. For instance, second process 120 may purge files to retain a certain amount of free space in cache 130 every hour. Alternatively, second process 120 may purge files whenever usage of cache 130 exceeds a certain threshold. As shown in FIG. 2, second process 120 may select and purge (at 10) files "F" and "Y" from cache 130.

Since the purging is performed asynchronously to the caching of newly requested files, second process 120 may asynchronously update its tracking of cached files by accessing the different instances of tracking file 140 at any time after the instances have been created by first process 110. In particular, second process 120 may periodically or conditionally query the shared storage of device 100 to determine if any instance of tracking file 140 is present.

Moreover, since the purging can be delayed relative to the caching of files, the asynchronous and delayed updating of tracked files does not impact operation of either first process 110 or second process 120. For instance, first process 110 may generate new instances of tracking file 140 every five minutes, and second process 120 may randomly or every hour perform a purge operation. Prior to performing the purge operation, second process 120 may retrieve all existing instances of tracking file 140 from storage in order to update its tracking of files in cache 130. Second process 120 may use the timestamps associated with each instance of tracking file 140 and/or with each entry in a tracking file 140 instance to not lose information (e.g., age, request counts, last access timestamp, etc.) that may be needed to select files for purging even though operations between first process 110, entering the files to cache 130, are not synchronized with operations of second process 120 performing the file purging.

After purging (at 10) one or more files from cache 130, second process 120 may receive (at 11) confirmation from cache 130 that the one or more files have been removed and/or may update (at 11'), in parallel or in response to receiving (at 11) confirmation, its tracking of the files in cache. For instance, second process 120 may update its tracking of cached files to remove file "F" and "Y", and thereby retain consistency between the files in cache 130 and the files tracked in cache 130 by second process 120.

Figure 3:
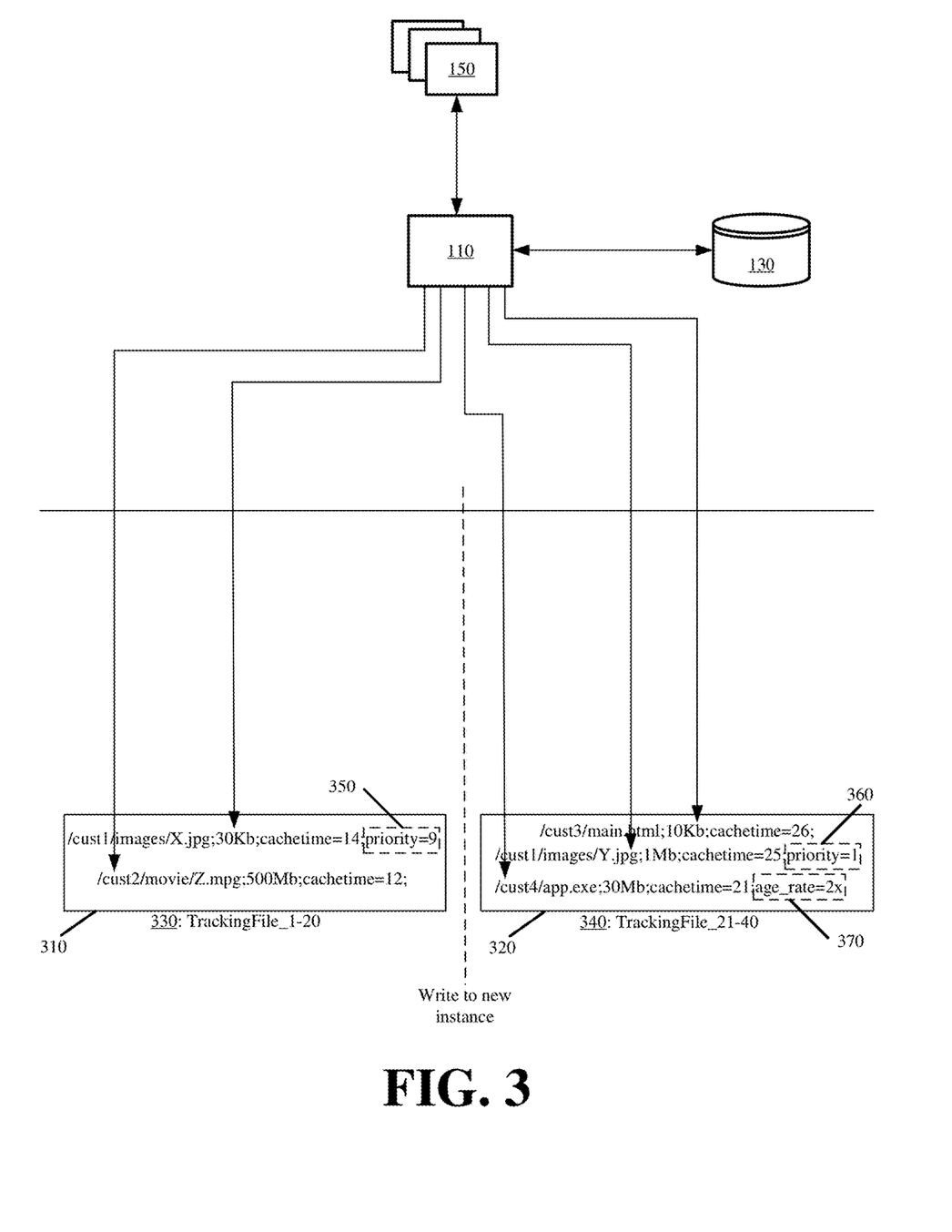
FIG. 3 conceptually illustrates examples of tracking file instances 310 and 320 in accordance with some embodiments described herein.

FIG. 3 conceptually illustrates examples of tracking file instances 310 and 320 in accordance with some embodiments described herein. As shown in FIG. 3, first process 100 writes entries for newly cached files to each instance 310 and 320 at different times. Each instance 310 and 320 has a unique filename 330 and 340. Filenames 330 and 340 may include a timestamp for when each instance 310 and 320 is created.

Each entry within instance 310 and 320 may identify a file that has been added to cache 130. Each file may be identified by a filename and/or a URL that clients 150, first process 110, other processes of device 100, and/or other devices may use to request and/or access the file from cache 130 and/or storage of device 100.

One or more entries may provide additional information about corresponding files. For instance, the file size, file type, originating content provider (e.g., customer) identifier, timestamp at which the corresponding file is entered into cache, number of times the file has been requested during an interval, metadata, and/or other information may be included as part of one or more entries in tracking file instances 310 and 320.

In some embodiments, one or more entries may include customized metadata 350, 360, and 370. First process 110 may provide customized metadata 350, 360, and 370 for entries associated with files of a given content provider, domain, type, size, and/or another parameter.

Customized metadata 350, 360, and 370 may be used to modify caching and/or purging behavior of device 100. For instance, a particular content provider may define metadata to age a first set of files faster than a second set of files of the particular content provider in cache. Consequently, second process 120 may purge the first set of files from cache 130 sooner than the second set of files if the files are entered into cache 130 at the same time. The metadata can represent conditions, expressions, and/or properties that may affect caching and/or purging behavior of device 100. The metadata can be included as query string arguments or in a configuration file that a content provider provides to device 100 for caching that content provider's files.

Figure 4:
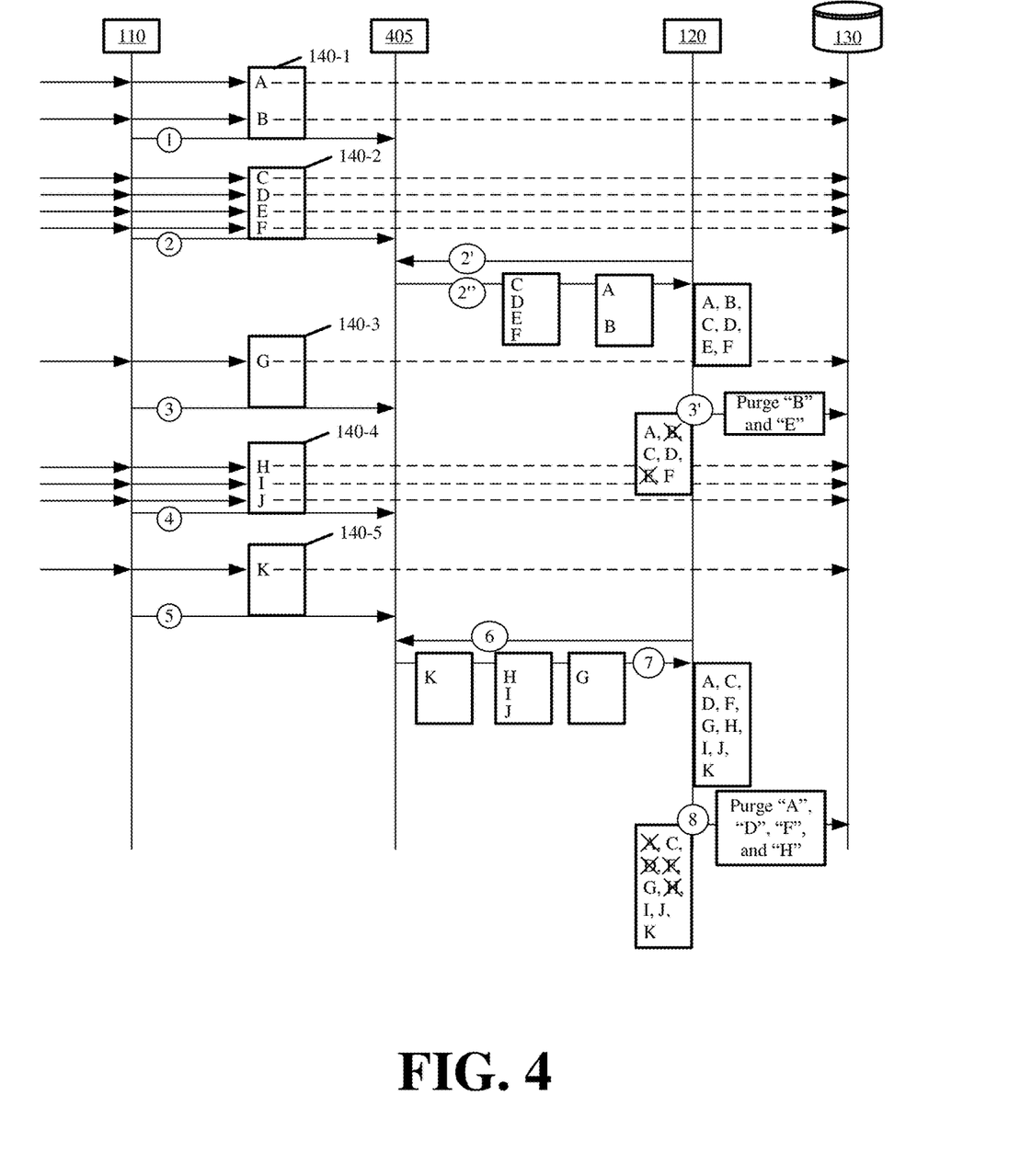
FIG. 4 illustrates cache management based on asynchronously tracking files in accordance with some embodiments described herein.

FIG. 4 illustrates cache management based on asynchronously tracking files in accordance with some embodiments described herein. FIG. 4 illustrates the asynchronous operation between first process 110 and second process 120 as relating to first process 110 entering files into cache 130 and second process 120 purging files from cache 130 based on an asynchronous tracking of the files first process 110 enters in cache 130.

As shown in FIG. 4, first process 110 may receive requests for various files. First process 110 may retrieve and enter into cache 130 requested files that were not previously in cache 130. Each file that is entered into cache 130 is written to an instance of tracking file 140. In some embodiments, first process 110 may also create an entry in tracking file 140 for requests that are directed to files that are in cache 130 and that are served from cache.

For instance, FIG. 4 illustrates first process 110 writing information about files "A" and "B" that are newly cached during a first period of time or first interval to first instance of tracking file 140-1, writing information about files "C", "D", "E", and "F" that are newly cached during a second period of time or second interval to second instance of tracking file 140-2, writing information about file "G" that is newly cached or that is in cache and requested during a third period of time or third interval to third instance of tracking file 140-3, writing information about files "H", "I", and "J" that are newly cached during a fourth period of time or fourth interval to fourth instance 140-4 of tracking file 140, and writing information about file "K" that is newly cached during a fifth period of time or fifth interval to fifth instance 450 of tracking file 140-5.

In some embodiments, first process 110 may make each instance of tracking file 140-1, 140-2, 140-3, 140-4, and 140-5 accessible to second process 120 after writing each corresponding entry to the tracking file instance, and placing the tracking file instance on shared storage 405 that can be accessed by second process 120. For instance, first process 110 may retain a single instance in memory for a period of time, populate that instance with entries of files entered into cache or that are requested and that reside in cache during that period of time, and moving that instance from memory to shared storage 405 after expiration of the period of time. For instance, first process 110 may place first instance of tracking file 140-1 on shared storage 405 at 1, second instance of tracking file 140-2 on shared storage 405 at 2, third instance of tracking file 140-3 on shared storage 405 at 3, fourth instance of tracking file 140-1 on shared storage 405 at 4, and fifth instance 405 of tracking file 140-1 on shared storage 405 at 5.

Second process 120 operates asynchronously from first process 110. Second process 120 may run periodically or in response to one or more conditions being met. For instance, second process 120 may run when the amount of free space in cache 130 is below a threshold amount.

As shown in FIG. 4, second process 120 performs a first set of operations after first process 110 has placed (at 1 and 2) tracking file instances 140-1 and 140-2 in shared storage 405. Second process 120 may perform the first set of operations to clear space in cache. The first set of operations may include tracking the files that are in cache 130, identifying the least recently used files in cache 130, and removing the least recently used files from cache 130. Second process 120 may update its tracking of files in cache 130 by querying (at 2') shared storage 405 for any tracking file instances that have been generated by first process 110 and that have not yet been accessed by second process 120. In this instance, second process 120 may identify tracking file instances 140-1 and 140-2 in shared storage 405. Each instance 140-1 and 140-2 may have a different filename. The filenames may include a timestamp for when instances 140-1 and 140-2 were placed into shared storage 405 by first process 110 or when the identified files were requested. Second process 120 may retrieve (at 2") and delete tracking file instances 140-1 and 140-2 from shared storage 405.

Second process 120 may update and/or create an internal table for tracking the files that are stored to cache 130 based on the retrieved instances of tracking file 140-1 and 140-2. Second process 120 may then select one or more files to purge from cache 130 according to one or more eviction policies. For instance, second process 120 may use a least recently used eviction policy to remove files "B" and "E" from cache 130. Second process 120 may then direct (at 3') cache 130 in deleting the selected files and may update (at 3') its internal table to remove entries for the removed files.

First process 110 continues to run asynchronously from second process 120, and may generate and write (at 3, 4, and 5) tracking file instances 140-3, 140-4, and 140-5 to shared storage 405 before second process 120 queries (at 6) shared storage 405 again. In response to the second querying (at 6) of shared storage 405, second process 120 identifies and retrieves (at 7) tracking file instances 140-3, 140-4, and 140-5, and then removes tracking file instances 140-3, 140-4, and 140-5 from shared storage 405. Second process 120 updates its internal table tracking the files in cache 130 based on the information from tracking file instances 140-3, 140-4, and 140-5. Second process 120 may use a least recently used eviction policy to select and remove (at 8) files "A", "D", "F", and "H" from cache 130. Second process 120 may update (at 8) its internal table to remove entries for the removed files.

As can be seen from FIG. 4, second process 120 may accurately track the files that are in cache 130 even if second process 120 experiences a temporary failure or does not synchronously update its tracking of cached files as each new file is entered into cache 130. The asynchronous tracking set forth herein reduces device 100 overhead relative to synchronous and/or other forms of tracking. In particular, intra-device messaging is significantly reduced as first process 110 no longer generates an IPC message for each file that is entered in cache 130 or that is requested from device 100. Instead, first process 110 may write an entry to an instance of tracking file 140 which may be retained in memory or disk. Eliminating the intra-device messaging allows first process 110 to respond to a greater number of client requests in less time.

In some embodiments, the asynchronous tracking may be used for other purposes in addition to or instead of cache management. For instance, second process 120 may perform log processing in addition to or instead of cache management based on the information that is obtained from the different instances of tracking file 140. The log processing may produce information that can be used to bill customers for cache usage, generate essentially real-time usage statistics, monitor device 100 performance, and/or provide other services.

Figure 5:
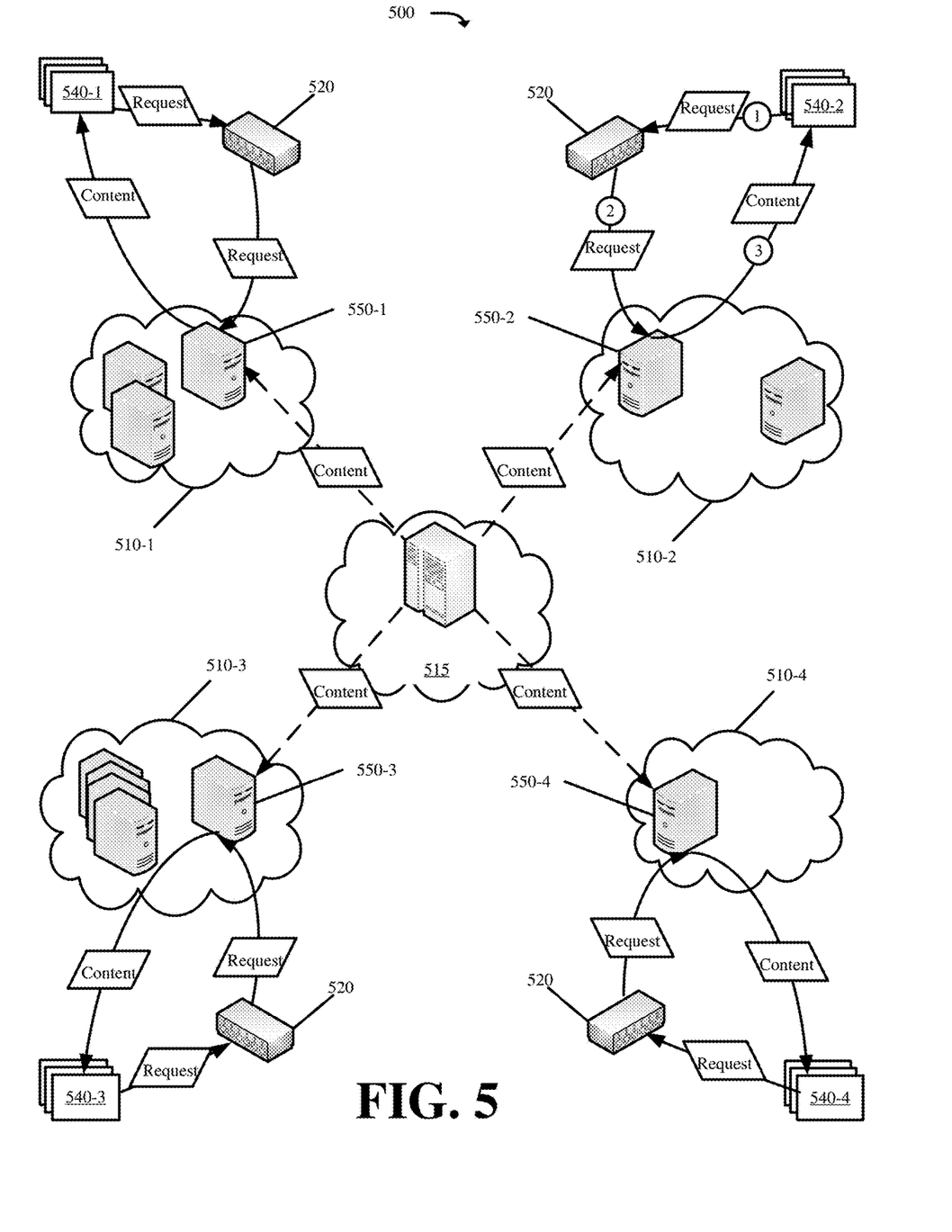
FIG. 5 illustrates a high-frequency or a high-volume storage environment 500 with devices or servers performing the asynchronous tracking of files in accordance with some embodiments.

FIG. 5 illustrates a high-frequency or a high-volume storage environment 500 with devices or servers performing the asynchronous tracking of files in accordance with some embodiments. Environment 500 may represent a content delivery network ("CDN") or other cloud-based system that hosts and distributes primary content on behalf of different content publishers. Environment 500 may include distribution points 510-1, 510-2, 510-3, and 510-4 (herein sometimes collectively referred to as "distribution points 510" or individually as "distribution point 510"), origin storage 515, and traffic management devices 520.

In the context of a CDN, each distribution point 510 represents a different point-of-presence ("PoP"). Distribution points 510 may be located at different edges of the Internet or other large network. Distribution points 510 may be geographically separated from one another. Each distribution point 510 may include one or more content distribution servers 550, and may further include other machines such as load balancers (not shown).

One or more servers 550 (e.g., server 550-1 of distribution point 510-1, server 550-2 of distribution point 510-2, server 550-3 of distribution point 510-3, and/or server 550-4 of distribution point 510-4) can be separate physical machines, or a set of virtual machines running on a partitioned or shared set of resources of one or more physical machines. Each server 550 may be representative of a different device 100. More specifically, each server 550 may run first process 110 to cache and/or deliver files of one or more content publishers and/or third-party content providers (e.g., advertisers) to client devices 540 (e.g., client devices 540-1 accessing distribution point 510-1, client devices 540-2 accessing distribution point 510-2, client devices 540-3 accessing distribution point 510-3, and/or client devices 540-4 accessing distribution point 510-4) that request the files from a corresponding server 550. Content distribution servers 550 may also run second process 120 to manage the cache and/or remove files from the cache according to one or more eviction policies.

Content publishers may offload delivery of their files to environment 500 by uploading their files to origin storage 515. Origin storage 515 may represent a centralized or distributed second-tier of storage in environment 500. In some embodiments, origin storage 515 may include one or more servers from which to fan-out the primary content to distribution points 510. In some embodiments, origin storage 515 may retrieve files that were not uploaded to origin storage 515 or that is not cached by origin storage 515 from content publisher servers.

Once server 550-1 at distribution point 510-1 retrieves a file from origin storage 515, server 550-1 may provide the retrieved file to client device 540-1 in response to a request for that file from client device 540-1. Server 550-1 may also locally cache a copy of the file so that subsequent requests for the same file that are routed to distribution point 510-1 can be served from server 550-1 cache without accessing origin storage 515.

Traffic management devices 520 may route client devices 540, and more specifically, client device 540 issued requests for files to one of distribution points 510 that can optimally deliver the requested files back to requesting client device 540. An optimal distribution point is selected, based on geographic proximity, network congestion, available resources, and/or other factors, to provide fastest delivery of the requested files to client device 540 relative to other distribution points 510.

Different implementations utilize different traffic management schemes, such as Anycast routing or Domain Name System (DNS) routing, to distribute client device 540 issued requests to an optimal distribution point 510. Accordingly, traffic management device 520 can include different combinations of Doman Name System (DNS) servers, load balancers, and routers performing Anycast, Border Gateway Protocol (BGP), and/or other routing of requests and data packets.

Figure 6:
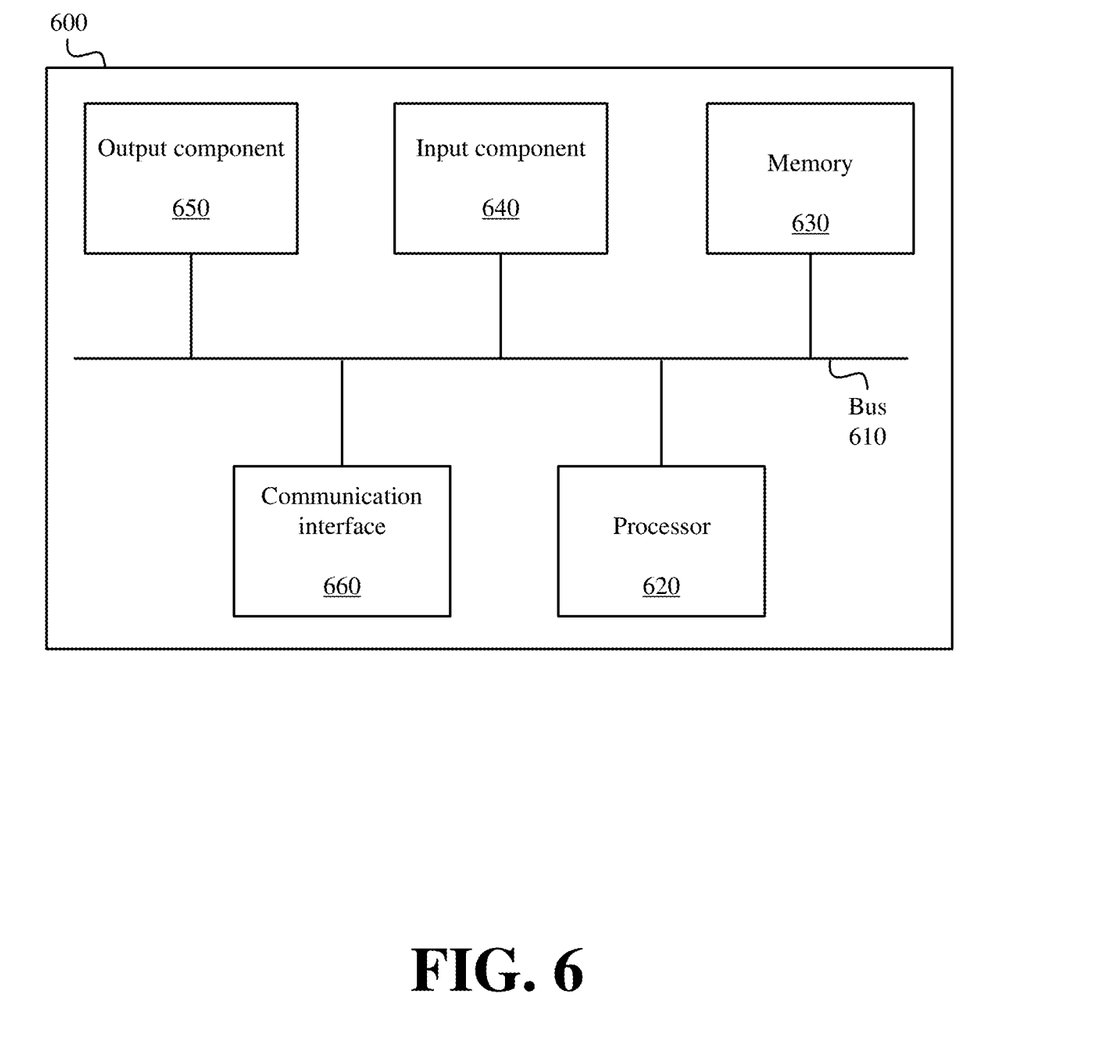
FIG. 6 illustrates example components of one or more devices, according to one or more embodiments described herein.

FIG. 6 is a diagram of example components of device 600. Device 600 may be used to implement certain of the devices described above (e.g., the system for multimodal multilabel tagging, modality generator 430, and tag generator 440). Device 600 may include bus 610, processor 620, memory 630, input component 640, output component 650, and communication interface 660. In another implementation, device 600 may include additional, fewer, different, or differently arranged components.

Bus 610 may include one or more communication paths that permit communication among the components of device 600. Processor 620 may include a processor, microprocessor, or processing logic that may interpret and execute instructions. Memory 630 may include any type of dynamic storage device that may store information and instructions for execution by processor 620, and/or any type of non-volatile storage device that may store information for use by processor 620.

Input component 640 may include a mechanism that permits an operator to input information to device 600, such as a keyboard, a keypad, a button, a switch, etc. Output component 650 may include a mechanism that outputs information to the operator, such as a display, a speaker, one or more light emitting diodes ("LEDs"), etc.

Communication interface 660 may include any transceiver-like mechanism that enables device 600 to communicate with other devices and/or systems. For example, communication interface 660 may include an Ethernet interface, an optical interface, a coaxial interface, or the like. Communication interface 660 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 600 may include more than one communication interface 660. For instance, device 600 may include an optical interface and an Ethernet interface.

Device 600 may perform certain operations relating to one or more processes described above. Device 600 may perform these operations in response to processor 620 executing software instructions stored in a computer-readable medium, such as memory 630. A computer-readable medium may be defined as a non-transitory memory device. A memory device may include space within a single physical memory device or spread across multiple physical memory devices. The software instructions may be read into memory 630 from another computer-readable medium or from another device. The software instructions stored in memory 630 may cause processor 620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
generating, by a first process executing on a device, different instances of a tracking file on shared storage of the device as different sets of files are cached by the device, each instance of the tracking file comprising a plurality of entries that identify a different plurality of files that are cached by the device while generating that instance of the tracking file, wherein said generating comprises storing a first instance of the tracking file with a first plurality of entries for a first plurality of files that are cached by the device during a first time, and storing a second instance of the tracking file with a second plurality of entries for a second plurality of files that are cached by the device during a second time that is after the first time;
accessing, by a second process executing on the device, a particular instance of the tracking file from the shared storage in response to initiating a purge operation on the device while continuing said generating by the first process, wherein said accessing by the second process is performed asynchronously from said generating by the first instance;
updating, by the second process, a record of cached files based on said accessing of the particular instance of the tracking file and the plurality of entries from the particular instance of the tracking file; and
purging one or more cached files based on entries that are in the record as a result of said updating and that satisfy at least one eviction policy, wherein the entries that are in the record differ from the plurality of entries from the different instances of the tracking file as a result of the first process generating new instances of the tracking file while the second process accesses one or more previously generated instances of the tracking file.

2. The method of claim 1 further comprising writing an entry for a particular file to the particular instance of the tracking file in response to the first process caching the particular file.

3. The method of claim 1 further comprising removing, by the second process, the one or more cached files from the record of cached files in response to said purging.

4. The method of claim 1, wherein generating the particular instance of the tracking file occurs during the first time, and wherein accessing the particular instance occurs during the second time.

5. The method of claim 1, wherein each entry of the plurality of entries from the particular instance comprises an identifier that identifies a different cached file, a size of the cached file, and a timestamp corresponding to a time at which the cached file is cached.

6. The method of claim 1 further comprising placing, by the first process, the different instances of the tracking file to the shared storage at a first rate, and accessing, by the second process, the different instances of the tracking file from the shared storage at a second rate that is less than the first rate.

7. The method of claim 1 further comprising:
removing, by the second process, the particular instance of the tracking file from the shared storage after said accessing, wherein the particular instance of the tracking file is the first instance of the tracking file;
scanning, by the second process, the shared storage for available instances of the tracking file at a subsequent time after said removing;
identifying, by the second process, the second instance of the tracking file after said accessing of the particular instance; and
accessing, by the second process, the second instance of the tracking file from the shared storage.

8. The method of claim 7 further comprising:
updating, by the second process, the record based on the second plurality of entries from the second instance of the tracking file; and
removing, by the second process the second instance of the tracking file from the shared storage.

9. The method of claim 1 further comprising initiating operation of the second process in response to cache utilization of the device exceeding a specified threshold.

10. The method of claim 9, wherein purging the one or more cached files reduces the cache utilization of the device below the specified threshold.

11. The method of claim 1, wherein said updating of the record is further based on entries from previously accessed instances of the tracking file.

12. The method of claim 1 further comprising selecting the one or more cached files according to the entries from the record that satisfy the at least one eviction policy based on one or more of size, age in cache, file type, and access frequency.

13. A device comprising:
a cache;
a non-transitory computer-readable medium storing different sets of processor-executable instructions;
a first process configured to execute a first set of processor-executable instructions, wherein executing the first set of processor-executable instructions causes the first process to:
store a first plurality of files requested during a first interval to the cache;
generate, in response to storing the first plurality of files, a first instance of a tracking file comprising a first plurality of entries identifying the first plurality of files stored to the cache during the first interval;
store a second plurality of files requested during a subsequent second interval to the cache;
generate, in response to storing the second plurality of files, a second instance of a tracking file comprising a second plurality of entries identifying the second plurality of files stored to the cache during the second interval;
a different second process configured to execute a second set of processor-executable instructions, wherein executing the second set of processor-executable instructions causes the second process to:
access the first instance of the tracking file during the second interval in response to initiating a purge operation during the second interval;
update a record of cached files based on said accessing of the first instance of the tracking file and the first plurality of entries from the first instance of the tracking file;
purge one or more cached files based on entries that are in the record as a result of said updating and that satisfy at least one eviction policy wherein the entries that are in the record are fewer than the first plurality of entries and the second plurality of entries as a result of the first process generating the second instance of the tracking file while the second process accesses the first instance of the tracking file.

14. The device of claim 13 further comprising shared storage to which the first process stores the first and second instances of the tracking file, and wherein the second set of processor-executable instructions further include processor-executable instructions that cause the second process to remove the first instance of the tracking file from the shared storage after said access of the first instance.

15. The device of claim 13, wherein the second set of processor-executable instructions further include processor-executable instructions that cause the second process to query for written instances of the tracking file at a different rate than the first process generates the first and second instances of the tracking file.

16. The device of claim 13, wherein the second set of processor-executable instructions further include processor-executable instructions that cause the second process to:
monitor cache utilization; and
perform said accessing, updating, and purging in response to the cache utilization exceeding a threshold.

17. The device of claim 13, wherein the second set of processor-executable instructions further include processor-executable instructions that cause the second process to:
remove the one or more cached files from the record after said purging;
restart during a third interval after experiencing a failure, wherein the third interval is after the second interval;
load the record from storage after restarting;
update the record based on the second plurality of entries from the second instance of the tracking file.

18. A method comprising: placing a first instance of a tracking file to shared storage at the end of a first interval, the first instance comprising a first set plurality of entries corresponding to a first set plurality of files that are entered in cache during the first interval;
placing a second instance of the tracking file to the shared storage at the end of a second interval, the second instance comprising a second set plurality of entries corresponding to a second set plurality of files that are entered in the cache during the second interval;
writing a third set plurality of entries to a third instance of the tracking file during a third interval, the third set plurality of entries corresponding to a third set plurality of files that are entered in the cache during the third interval;
asynchronously initiating a purge operation during the third interval by scanning the shared storage for completed instances of the tracking file, and by accessing the first and second instances of the tracking file while writing the third set plurality of entries to the third instance of the tracking file during the third interval;
updating a list of cached files with the first plurality of entries and the second plurality of entries from the first and second instances of the tracking file identified in response to said scanning; and
purging one or more of the first plurality of files and the second plurality of files from the cache based on one or more entries that are in the list of cached files as a result of said updating and that satisfy eviction criteria, wherein the list of cached files excludes the third plurality of entries as a result of asynchronously initiating the purge operation based on the first instance and the second instance of the tracking file being placed onto the shared storage while writing to the third instance during the third interval.

19. The method of claim 18 further comprising removing the first instance and the second instance from the shared storage in response to said updating.

20. The method of claim 19 further comprising rescanning the shared storage during a fourth interval for completed instances of the tracking file, and updating the list of cached files with the third plurality of entries from the third instance of the tracking file identified in response to said rescanning.

\* \* \* \* \*